Oct. 7, 1930.  C. F. WALLACE  1,777,987
APPARATUS FOR TREATING WATER
Filed Nov. 30, 1927  4 Sheets-Sheet 1
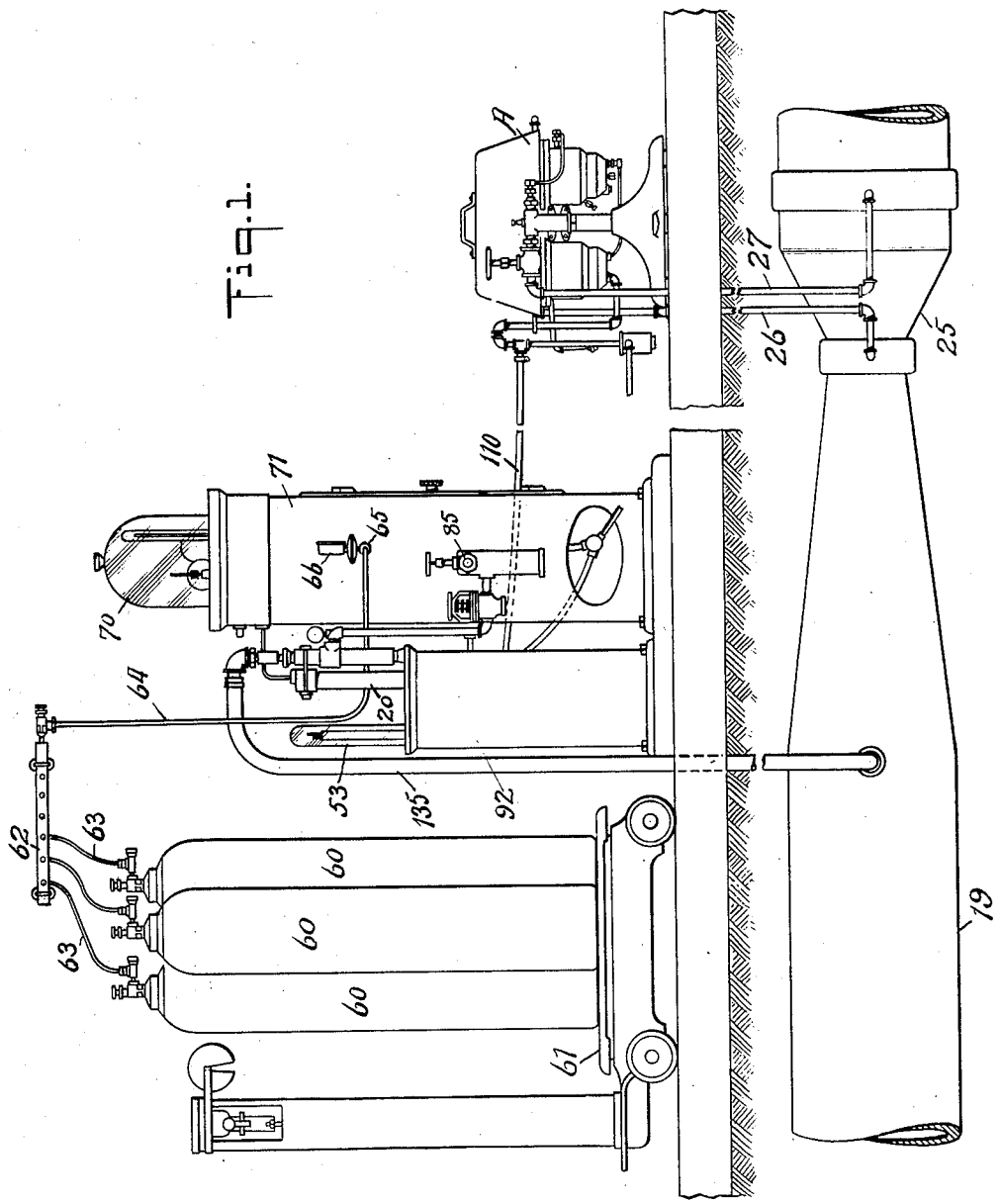
INVENTOR
Charles F. Wallace
BY
Arthur L. Kent
his ATTORNEY Oct. 7, 1930.                C. F. WALLACE                 1,777,987
                        APPARATUS FOR TREATING WATER
                    Filed Nov. 30, 1927        4 Sheets-Sheet 2.
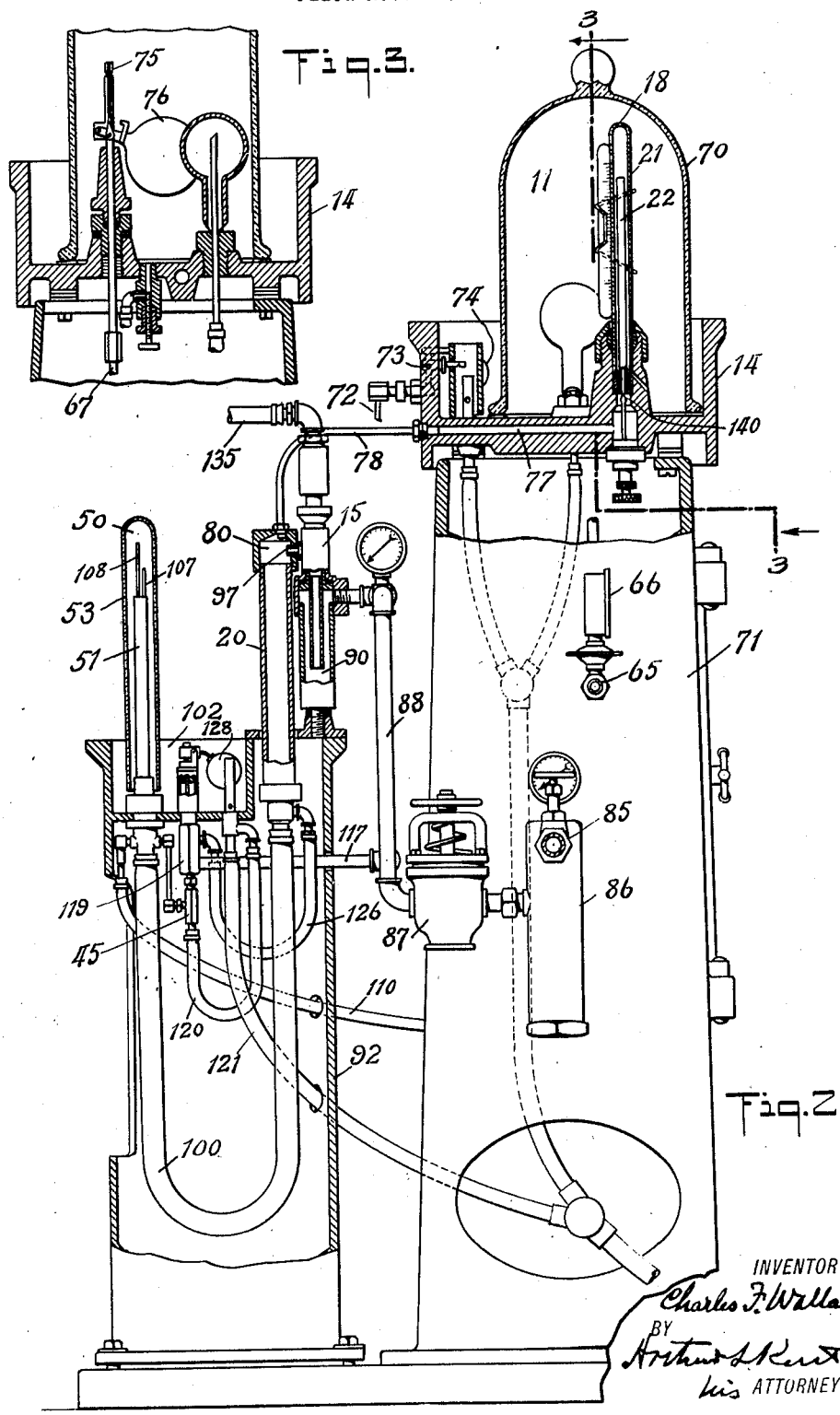

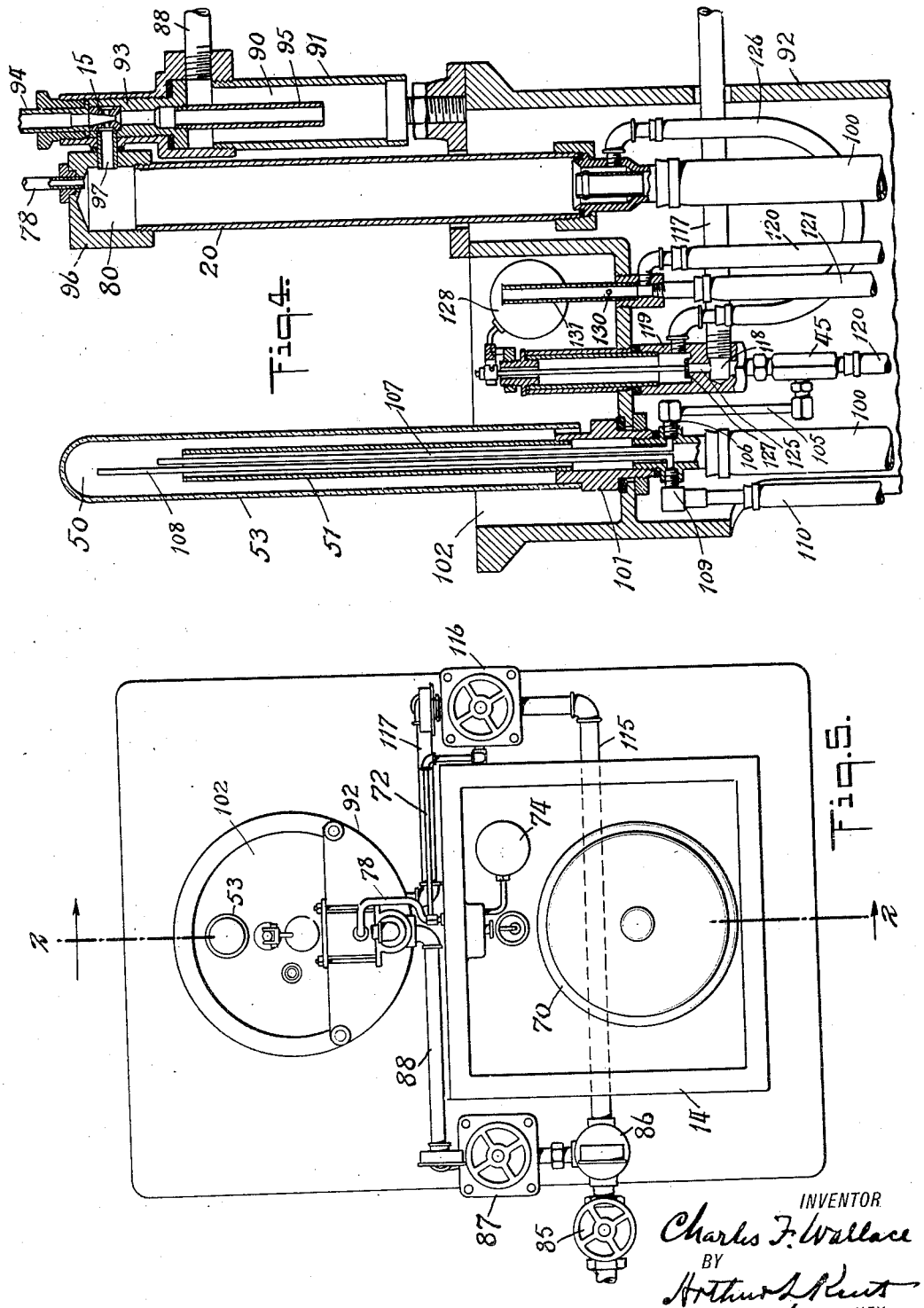

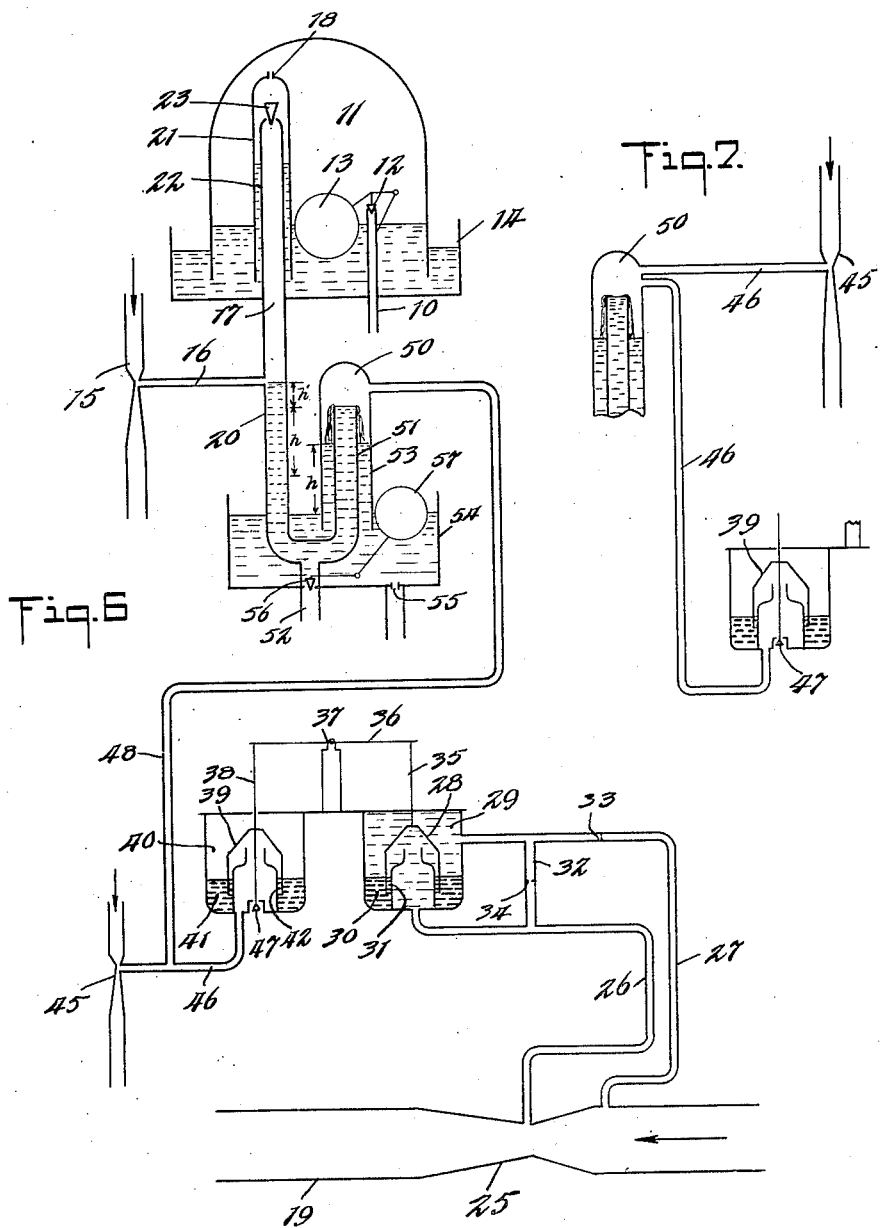

Patented Oct. 7, 1930

1,777,987

UNITED STATES PATENT OFFICE

CHARLES F. WALLACE, OF WESTFIELD, NEW JERSEY, ASSIGNOR TO WALLACE & TIERNAN COMPANY, INC., OF BELLEVILLE, NEW JERSEY, A CORPORATION OF NEW YORK

APPARATUS FOR TREATING WATER

Application filed November 30, 1927. Serial No. 236,853.

This invention relates to apparatus for treating water, and more particularly to apparatus whereby a treating gas is supplied to flowing water at a rate which is automatically varied according to the quantity of the water flowing. The invention has been made especially with the idea of providing a practical, reliable apparatus whereby a treating gas, and more particularly chlorine, may be added in suitable relatively small proportionate and automatically regulated amounts to flowing water such as the water of city or town supplies or sewage or other watery liquids; and the invention aims to provide an improved apparatus for this purpose in which the chlorine or other treating gas while in the apparatus is at a substantially atmospheric or slightly negative pressure, and so to control the flow of the chlorine gas as to avoid trouble from the formation of chlorine hydrate.

In an apparatus according to the invention, the chlorine or other treating gas, taken from a tank of compressed liquefied gas or other source of supply under pressure, is supplied to a flow-controlling orifice at a constant substantially atmospheric pressure and is drawn through the orifice and mixed with a minor flow of water by means of a water aspirator or other suitable suction device the suction head on the suction side of which is controlled by a negative pressure which varies proportionately to the square of variations in the rate of flow of the water to be treated, and which negative pressure is controlled by a positive pressure, and more especially a pressure difference, developed by the flowing water.

A full understanding of the invention can best be given by a description thereof in connection with a diagrammatic showing of an illustrative embodiment of the invention, and a detailed description of an approved form of apparatus embodying the various features of the invention in connection with drawings illustrating such an apparatus especially designed for treating flowing water with chlorine. In the accompanying drawings:

Fig. 1 is a general view of an automatic chlorinating apparatus according to the invention;

Fig. 2 is an enlarged view, partly in section on line 2—2 of Fig. 5, of the parts of the apparatus by which the flow of chlorine is controlled in accordance with a varying negative pressure produced by the flowing water;

Fig. 3 is a partial sectional view taken on line 3—3 of Fig. 2;

Fig. 4 is an enlarged sectional view of parts appearing at the left in Fig. 2 and sectioned in the same plane as Fig. 2;

Fig. 5 is a plan view of the parts appearing in Fig. 2;

Fig. 6 is a diagrammatic view of an apparatus according to the invention; and

Fig. 7 is a partial diagrammatic view showing certain connections corresponding more closely to the apparatus illustrated in Figs. 1 to 5 than as shown in Fig. 6.

A complete apparatus according to the invention may be considered as made up of three parts, namely: the chlorine flow-control apparatus, by which chlorine gas, taken from a tank of compressed liquefied chlorine or other source of supply under pressure, is first reduced to a constant substantially atmospheric pressure, and is then drawn through a flow-controlling orifice, which most desirably forms part of a flow meter, by the suction of a water aspirator or other suitable suction device by which the gas is mixed with and taken into solution in a minor flow of water, the solution thus produced being then continuously fed into the flowing water to be treated; apparatus for producing a negative pressure which varies in proportion to the square of variations in the rate of flow of the water to be treated, or quantity of water flowing; and means providing a vacuum-transferring water-seal by which the proportionately varying negative pressure is transferred to the chlorine control apparatus to vary the suction head on the suction side of the aspirator and cause the drop in pressure across the flow-controlling orifice through which the chlorine is drawn from the constant pressure supply, to vary proportionately with variations in said negative pressure. The drop in pressure across the flow-controlling orifice through which the chlorine gas passes will thus be varied proportionately to the square of variations in the rate of the flow of the water to be treated, and the amount of chlorine passing through the orifice to the aspirator to be combined with the minor flow of water and then discharged continuously into the water to be treated will vary proportionately to variations in the quantity of water to be treated flowing, that is, a constant ratio will be maintained between the rate of supply of the chlorine and the quantity of water flowing.

For controlling the flow of chlorine, I most desirably employ, and have shown, an apparatus such as described in my copending application filed November 30, 1927, Serial No. 236,851, and for producing the controlling negative pressure, I most desirably employ, and have shown, an apparatus such as described in my co-pending application filed November 30, 1927, Serial No. 236,852. The present invention comprises the combining of flow controlling apparatus and proportionately varied negative pressure producing apparatus such as disclosed by said co-pending applications with apparatus for controlling the flow-controlling apparatus by the proportionately varying negative pressure.

Referring now to Fig. 6, in the apparatus illustrated diagrammatically in this figure, which represents an apparatus according to the invention intended especially for supplying chlorine to flowing water in relatively small proportionate and automatically varied amounts, the chlorine flows from a tank of compressed liquefied chlorine, or other source of supply under pressure, through a supply tube 10 into a chamber 11 past a reducing valve 12 which is controlled by a ball float 13 to maintain a slightly negative pressure within the chamber. The chamber casing, which is most desirably a glass bell jar, extends upward from a tray 14 in which water is maintained at a constant level, and the chamber casing is formed to provide for the passage of water between the chamber and the space in the tray outside the chamber.

A water aspirator 15 in communication with the chamber 11 through a suction passage 16 and a gas passage 17 and flow-controlling orifice 18 draws chlorine gas from the chamber, mixes it with a minor flow of water which is continuously supplied to the water flowing in a conduit 19. As chlorine gas is drawn from the chamber 11 by the action of the aspirator, the pressure within the chamber is reduced. As the pressure within the chamber is reduced below atmospheric pressure, the water rises in the chamber, and when the water reaches the level corresponding to the desired negative pressure to be maintained within the chamber, the float 13 is lifted and opens the valve 12, permitting chlorine gas to enter the chamber. If the gas enters the chamber faster than it is withdrawn from the chamber by the aspirator, the water level within the chamber is depressed, permitting the float to fall and close the valve. Equilibrium is thus established, and chlorine gas will be supplied to the chamber at the rate at which it is drawn from the chamber by the aspirator.

The rate at which the chlorine gas is drawn from the chamber by the aspirator will depend on the drop in pressure across the orifice 18 and the size of the orifice, and the pressure drop across the orifice will depend on the negative pressure maintained on the suction side of the aspirator. This negative pressure is controlled and determined by the negative head of a column of water in a water-column tube 20 from which the suction passage 16 leads to the aspirator throat and from the upper end of which the passage 17 connects to the orifice 18. The passage 17 may lead directly to the flow-controlling orifice 18, but as shown, and most desirably, the orifice 18 is the inlet orifice of an orifice flow meter tube 21 which, for convenience, is placed within the chamber 11 and takes the water for supplying its indicating water-column through its open lower end from the water within the chamber, and the passage 17 is by way of a tube 22 which extends upward within the outer meter tube 21, having an inlet opening at its upper end above the maximum level to which water rises in the tube 21. For varying the dosage, or proportionate rate of supply of chlorine to the water to be treated, an adjustable valve 23 is provided for varying the flow resistance between the orifice 18 and the suction passage 16, thereby reducing as desired the suction head transmitted to the orifice 18. The rate at which chlorine is supplied will always depend on the drop in pressure across the orifice 18, and this drop in pressure will be indicated by the level at which the water stands in the tube 21, so that, the orifice being a fixed orifice of known size, the water level within the tube 21 will indicate the amount of chlorine flowing from the chamber 11. The meter tube will, of course, be provided with a suitable scale which may be calibrated to show the rate of flow of chlorine or to show the pressure drop across the orifice.

A Venturi tube 25 interposed in the conduit 19 develops a pressure difference in the flowing water which is transmitted by low and high pressure pipes 26 and 27, respectively, to the opposite sides of a bell 28 suspended within a closed chamber 29 the bottom of which contains mercury 30 in which the lower open end of the bell is submerged. A shield, or circular partition, 31 open at the top extends from the bottom wall of the chamber upward within the bell. The low pressure pipe 26 leads to an opening in the bottom wall of the chamber casing within the partition 31, and the high pressure pipe 27 leads to an opening into the chamber above the mercury level, so that the outside of the bell will be subjected to liquid pressure transmitted from the high pressure pipe 27 and the inside or under side of the bell to liquid pressure transmitted through the low pressure pipe 26. A by-pass connecting pipe 32 extends between the pipes 26 and 27, and a flow restricting orifice 33 for eliminating flow friction is provided in the pipe 27, and a flow-restricting orifice 34 is provided in the by-pass pipe 32 for determining the differential pressure transmitted to the bell 28. By means of this by-pass connection and the orifice 33 and 34, a pressure difference of considerable magnitude developed by the Venturi tube and varying over a wide range may be reduced to a low differential varying within a comparatively narrow range applied to the bell 28.

The bell 28 is connected by a link 35 to one end of a lever 36 fulcrumed at 37, and the other end of the lever is connected by a link 38 to a similar bell 39 supported within a chamber 40 with its lower open end submerged in a body of mercury 41 in the bottom of the chamber. A circular partition, or shield, 42 extends up from the bottom of this chamber within the bell with its upper open end above the maximum level of mercury within the bell. The space within the chamber 40 above the mercury is open to the external atmosphere so that the outside of the bell 39 is subjected to atmospheric pressure. An aspirator 45 connected by a suction passage 46 to the space beneath the bell tends to produce a partial vacuum, or negative pressure, beneath the bell, and the degree of negative pressure thus produced by the aspirator is controlled by an air inlet valve 47 which is controlled by the up and down movement of the bell to restrict the inflow of air to the space beneath the bell when the bell moves upward.

When there is no flow of water through the conduit 19, the pressure on the outside and on the inside of the bell 28 will be equal, and the air inlet valve 47 will be open to supply the aspirator 45 with all the air it can take and to maintain atmospheric pressure inside the bell 39 which will balance the atmospheric pressure on the outside of the bell. When there is a flow through the conduit, a differential pressure is produced by the Venturi tube, and the pressure on the outside of the bell 28 becomes greater than the pressure on the inside of the bell, and the bell 28 is thereby caused to move downward. The downward movement of the bell 28 raises the bell 39, causing the air inlet valve to be partially closed and thereby causing a partial vacuum to be developed in the space beneath the bell 39. Movement of the bells will cease when the difference in pressures acting on the bell 39 exactly balances the difference in pressures acting on the bell 28, and any variation in the pressure difference acting on the bell 28 resulting from variation in the rate of flow of the water through the conduit will then cause a movement of the bell 39 and adjustment of the valve 47 to correspondingly vary the negative pressure beneath the bell 39. The negative pressure maintained beneath the bell 39 and in the suction line 46 will thus be varied proportionately with variations in the pressure difference acting on the bell 28, and, therefore, in proportion to the square of variations in the quantity of water flowing through the conduit.

The proportionately varying negative pressure produced by the differential converting apparatus is transmitted through a connecting pipe 48, as illustrated in Fig. 6, to the negative air pressure chamber 50 of the vacuum-transferring water-seal by which the proportionately varying negative pressure is transferred to the chlorine control apparatus. This vacuum, or negative pressure, transferring device or apparatus, comprises the water-column tube 20 from which the aspirator 15 draws through the suction passage 16, and an overflow tube or pipe 51, the lower ends of said tubes being connected so as to form in effect a U tube, to which water is supplied through a supply pipe 52. The open upper end of the overflow tube 51 is at a distance below the center line of the suction passage 16 equal to the elevation of the operating level of water within the chamber 11 above the level of the water in the tray 14 outside the chamber. The upper end of this overflow tube opens into the chamber 50, which is sealed against entrance of air. As shown, this chamber 50 is formed by the closed upper end of an inverted tube or casing 53 which extends down about the tube 51 and has its lower end submerged in water in a constant level tray 54. The overflow from the tube 51 falls through the space within the casing tube 53 into the tray. Water constantly flows from the tray 54 through an outlet orifice 55, and a valve 56 actuated by a float 57 controls the supply of water to the U tube so that the amount overflowing from the tube 51 will always be equal to the outflow through the orifice 55.

When neither of the aspirators, 15 and 45, are operating, and assuming that there is atmospheric pressure in the chamber 50 and in the water-column tube 20 above the water, then the water will be overflowing from the tube 51 and will stand in the tube 20 at the level of the top of the tube 51. If, now, a negative pressure developed by the aspirator 45 and controlled by a pressure difference developed by water flowing through the conduit 19 is transmitted to the chamber 50, then the negative pressure on the column of water in the tube 51 will tend to upset the equilibrium in the U tube, and the water level in the tube 20 will be drawn down to a distance below the upper end of the tube 51 corresponding to the negative pressure in the chamber 50. If, for example, the negative pressure in chamber 50 were equal to $h$, indicated by the elevation of water in the tube 53 above the level in the tray 54, the water in the tube 20, the aspirator 15 still not being in operation, would be drawn down to a distance $h$ below the top of the tube 51. Assuming now that the suction passage 16, instead of opening from the tube 20 at the level above the top of the tube 51, is at the same level as the top of tube 51, if the aspirator 15 is then put in operation with a negative pressure $h$ still maintained in the chamber 50, the suction of the aspirator will lift the water in the tube 20 to the outlet passage 16, and will maintain a partial vacuum, or negative pressure, on the suction side of the aspirator 15 and in the passage 17 equal to $h$, excess capacity of the aspirator being satisfied by water drawn from the tube 20 through the passage 16.

If the inlet to the passage 16 from the tube 20 were at the level of the top of the tube 51, the negative pressure on the suction side of the aspirator 15 would then always equal the negative pressure in the chamber 50, and, therefore, would vary proportionately to the square of variations in the rate of flow of water through the conduit 19. If the chlorine gas were maintained at atmospheric pressure in the chamber 11, a drop in pressure across the orifice 18 varying proportionately to variations in the negative pressure developed beneath the bell 39 would result from thus transferring to the suction side of the aspirator 15 a varying negative pressure equal to the varying negative pressure in the chamber 50, and the flow of gas through the passage 16 to the aspirator would vary proportionately with the square of variations in the flow of water through the conduit 19.

When, however, the gas pressure maintained in the chamber 11 is a slightly negative pressure, for example, 2″ less than atmospheric pressure, the differential pressure across the orifice 18 starts at a base which is not atmospheric pressure but is 2″ less than atmospheric pressure, and for most accurate results it is necessary that the varying pressures maintained on the suction side of the aspirator 15 shall start from the same base. This is accomplished by raising the inlet opening to the suction passage 16 from the tube 20 to correct for this initial base, that is, 2″ in the case supposed, and, in any case, a distance equal to the elevation of the water level within the chamber 11 above the water level in the tray 14 outside the chamber. The suction passage 16 is shown so raised in Fig. 6. The aspirator 15 will, therefore, have to lift the water in the tube 20 the distance $h$ plus a distance $h'$ equal to the elevation of water in the chamber 11 above the water level in the tray 14. Obviously, if the gas were maintained in the chamber 11 at a slightly positive pressure, the suction passage 16, in order to compensate for this base slightly above atmospheric pressure, should communicate with the tube 20 a corresponding distance below the level of the top of the tube 51.

In Fig. 7 the suction chamber 50 of the vacuum-transfer apparatus is shown as connected in series between the aspirator 45 and the space beneath the bell 39, that is, the suction pipe 46 from the aspirator extends first to the chamber 50, and from the chamber 50 to the space beneath the bell. The result, providing the suction passage is of sufficient size, is the same as with these parts arranged as in Fig. 6, that is, a negative pressure is maintained in the chamber 50 equal to the varying negative pressures developed beneath the bell 39.

Referring now to Figs. 1 to 5, these figures show an apparatus built to embody the invention shown diagrammatically by Figs. 6 and 7. In describing the apparatus as illustrated in these views, the same reference numerals will, so far as possible, be used as are applied to corresponding parts in the diagrammatic views.

Fig. 1 shows the complete apparatus with all parts thereof, excepting the Venturi tube and the pressure lines leading thereto and the solution pipe leading to the water conduit, mounted on the same level. They might be so mounted, but, usually, the apparatus shown for producing the controlling negative pressure will be at a lower level than the rest of the apparatus since this pressure-converting apparatus must be located at such an elevation that it is always below the minimum hydraulic gradiant, so that with maximum flow through the Venturi tube both of the pressure lines leading therefrom are under positive pressure at the elevation of the differential chambers of the converting apparatus.

In the apparatus as shown, the controlling varying negative pressure transmitted to the suction chamber 50 is produced by a differential converting apparatus shown at A in Fig. 1 which is operated by means of relatively varying pressures developed by a Venturi tube 25 interposed in the water conduit 19, which pressures are transmitted to the converting apparatus through low and high pressure leads 26 and 27. This converting apparatus is fully described in my said copending application Serial No. 236,852. As shown in Fig. 1, the pressure pipes leading from the Venturi tube and the connections to the converting apparatus are arranged somewhat differently from the apparatus shown in said application, but the apparatus is, or may be, in all essentials the same in construction and operation as shown in said application and as illustrated diagrammatically in Fig. 6 of this application.

The chlorine gas in the apparatus shown is supplied from a tank 60 of compressed liquefied chlorine. Three such tanks are shown in Fig. 1 mounted on a platform scale 61 and connected to a manifold 62 by connecting tubes 63, each tank being provided with the usual main and auxiliary cut-off valves. Setting the chlorine tanks on scales is customary and desirable, and the connection of several tanks through a manifold is convenient, especially for supply apparatus of large capacity. Obviously, however, a single tank standing on the floor might be connected directly to the control apparatus. From the manifold 62, a connecting tube 64 leads to a chlorine supply connection 65 provided with a pressure gauge 66, and from the connection 65 a chlorine supply tube 67 leads into the chlorine chamber 11. The chamber 11 is formed by a bell jar 70 which stands open end down in the tray 14 which is mounted on top of a pedestal 71. Water is supplied to the tray through a supply pipe 72, and a constant water level is maintained in the tray by means of a valve 73 controlled by a float 74. The bell jar is supported so as to provide for passage of water into the jar beneath its lower edge.

The chlorine supply tube 67 leads upward through the bottom of the tray 14 and through a stuffing box to a point above the maximum water level within the bell jar, and the supply of chlorine is controlled by a valve 75 adapted to seat at the upper end of the tube 67 and operated by a ball float 76. By the action of the aspirator 15, chlorine gas is drawn from the chamber 11 through the flow-controlling orifice 18 in the top of the meter tube 21. This tends to reduce the pressure in the chamber 11 causing the water level within the chamber to rise, but the float, moving with change in water level within the chamber, controls the supply of chlorine gas to the chamber so as to maintain the rate at which chlorine enters the chamber equal to the rate at which it is withdrawn through the orifice 18, thereby maintaining the desired constant pressure within the chamber, this pressure so maintained being determined by the water level at which the float closes the chlorine valve. The apparatus as shown is intended to operate with a slight negative pressure maintained in the chamber. The parts connected with the tray and bell jar are, or may be, constructed as more particularly described in my said application Serial No. 236,851.

The chlorine passes from the meter tube down through the fixed inner tube 22 and through a passage 77 in the bottom of the tray 14 and tube 78 to a suction chamber 80, from which the gas is drawn into the aspirator throat.

Water for supplying the aspirator 15 enters the apparatus through a shut-off valve 85, from which it passes through a strainer 86 and then by pipe to a pressure-reducing valve 87, from which the water at the desired pressure, determined by adjustment of the valve, passes through pipe 88 to the top of a chamber 90 formed by a vertical casing or tube 91 which, in the construction shown, is mounted on, and extends upwardly from, the top of a smaller pedestal 92. The aspirator 15 is mounted on top of this tubular casing 91 and is formed by a small Venturi tube seated in a tubular fitting 93 and held in place by a tubular fitting 94 which provides the outflow passage from the aspirator. From the fitting 94 a tube 95 extends downward within the chamber 90 to a substantial distance below the water inlet to the chamber. The chamber 90 is thus adapted to serve as a diffusion chamber to prevent access of chlorine water to the supply line when the apparatus is shut down.

The suction chamber 80 is formed in a block 96 which is secured to the casing of the aspirator 15 as indicated in Figs. 1 and 4. A water-column tube 20 extends downward from the block 96 and is open at its upper end to the suction chamber 80 which forms, in effect, a continuation of the bore of the tube. From the chamber 80, gas drawn from the chamber 11 and water from the tube 20 pass through a short horizontal suction passage 97 to a closed space surrounding the throat of the aspirator from which they enter the aspirator throat through a series of openings located just beyond the critical cross-section of the throat. The negative pressure maintained on the suction side of the aspirator 15, that is, in the chamber 80, will thus be determined by the negative head of the column of water in the water-column tube 20, from which water is drawn by the aspirator through the suction passage 97 to satisfy the excess capacity of the aspirator.

The negative head of the column of water in the tube 20 is controlled by, and varies with, variations in the negative pressure transmitted to the chamber 50. The negative pressure transferring apparatus, as illustrated in Figs. 1 to 5, is essentially the same as the illustrative embodiment of the invention shown diagrammatically in Figs. 6 and 7. As shown in Figs. 1 to 5, the water-column tube 20 forms one leg of a U tube the other leg of which is formed by an overflow tube 51, said tubes being connected by a U pipe or hose 100, which extends down far enough to prevent chlorine water from the tube 20 causing damage by rising in the other leg of the U tube when the apparatus is shut down. The overflow tube 51 extends upward from a flanged nipple 101 which extends through the bottom of a constant level water-holding tray or box 102 formed in the top of the pedestal 92. The upper end of the overflow tube is, for the reason before explained, at a distance below the suction passage 97 equal to the elevation of the operating water level in the chlorine chamber 11 above the water level in the tray 14 outside the chamber. The overflow tube opens into the chamber 50 which is formed by the closed upper end of an inverted tube or casing 53 which extends downward about the tube 51 and has its lower end submerged in the water in the tray 102, into which the overflow from the tube 51 falls through the space within the casing tube 53.

The aspirator 45, which is really a part of the converter A, is, for convenience, located within the pedestal 92, and the air suction line leads from the aspirator by pipe 105, thence through a connection 106 to a tube 107 extending upwardly through the overflow tube 51 to the space, or suction chamber 50, in the top of the tube 53, and then by pipe 108 from the chamber 50 down through the tube 51, and by connection 109 to a tube 110 which leads on a downward slant to the converter A, connecting to the negative pressure chamber of the converter, as illustrated diagrammatically in Fig. 7. Water for supplying the aspirator 45 is taken from the strainer 86 by pipe 115 to a second pressure-reducing valve 116 by which the pressure is reduced as required, and from the reducing valve, the water, at the proper reduced pressure, flows by pipe 117 to a chamber 118 in a block 119 hung from the bottom of the tray 102. The aspirator 45 is hung from the bottom of the block 119, and the water passes from the chamber down through the aspirator and through a connecting pipe 120 which extends first downward and then upward again and joins the waste pipe 121 which takes water from the tray 102.

Water also flows from the chamber 118 upward through a valve-controlled port 125 to supply the U tube formed by the water-column tube 20 and the overflow tube 51 and their U connecting pipe 100. The connection from the port 125 to the U tube is through a pipe 126 which connects to the U tube at the bottom of the tube 20, and which to avoid damage from chlorine water when the apparatus is shut down forms a downwardly extending loop. The valve 127 which controls the flow of water through the port 125, is actuated by a ball float 128 to maintain a constant water level in the tray 102, which as stated receives the overflow from the tube 51, and from which there is a continuous outflow of water through an outflow orifice 130, which is desirably formed in an overflow tube 131 which connects to the waste pipe 121. The valve will thus be controlled by the float to supply sufficient water to the U tube for the overflow from tube 51 equal to the outflow through the orifice 130 and in addition enough to make up for the water taken from the tube 20 by the aspirator 15. The water supply pipe 72, which leads to the inlet valve 73 of the tank 14, also takes water at reduced pressure from the valve 116, as shown in Fig. 5.

Parts of the apparatus with which chlorine comes in contact will, of course, be made of chlorine resistant material.

The operation of the apparatus will be understood from the description given in connection with the diagrammatic views, Figs. 6 and 7. Chlorine gas, because of the negative pressure produced by the aspirator 15, is drawn into the aspirator throat and mixed with the minor flow of water through the aspirator to form a solution of chlorine in water which, passing from the aspirator, is delivered continuously through a solution discharge pipe 135 and discharged into the water flowing through the conduit 19. The controlling negative pressure transmitted from the differential converting apparatus A to the chamber 50 of the vacuum transferring means, by varying the negative head of the water-column in the tube 20, controls the negative pressure on the suction side of the aspirator and causes the pressure drop across the flow-controlling orifice 18 to vary proportionately to the variations in the pressure difference developed by the Venturi tube. Chlorine will thus be added to the flowing water at a rate which varies proportionately to variations in the quantity of water flowing, that is, a constant ratio is maintained between the rate of supply of the chlorine and the quantity of water flowing.

The apparatus is provided with adjusting means for varying this ratio between the rate of supply of chlorine and the rate of flow of water. For this purpose, in the apparatus shown there is provided a valve 140 which co-acts with a seat at the bottom of the inner meter tube 22 to provide, like the valve 23 in Fig. 6, an adjustable restriction in the passage through which the chlorine gas flows from the orifice 18 to the suction chamber 80. The flow resistance resulting from this restriction reduces, according to the adjustment of the valve, the suction head transmitted from the chamber 80 to the discharge side of the orifice 18, and adjustment of the valve changes the ratio between the rate of supply of the chlorine and the rate of flow of the water to be treated, or in other words, changes the dosage.

What is claimed is:

1. Apparatus for treating flowing water, comprising means providing a flow-controlling orifice, means for supplying a treating gas to said orifice under a constant substantially atmospheric pressure, a suction device connected to a passage leading from said orifice, means for determining the negative pressure on the suction side of the suction device by the negative head of a column of liquid raised by the suction device, and means controlled by the flowing water to be treated for varying said negative head according to the quantity of water flowing.

2. Apparatus for treating flowing water, comprising means providing a flow-controlling orifice, means for supplying a treating gas to said orifice under a constant slightly negative pressure, a water aspirator connected to draw the gas through said orifice and to mix it with a minor flow of water through the aspirator, means for determining the negative pressure on the suction side of the aspirator by the negative head of a column of water raised by the suction of the aspirator, and means controlled by a pressure difference developed by the flowing water to be treated for varying said negative head proportionately to the square of variations in the quantity of water flowing.

3. Apparatus for treating flowing water, comprising means providing a flow-controlling orifice, means for supplying a treating gas to said orifice under a constant substantially atmospheric pressure, a water aspirator connected to a passage leading from said orifice, a water-column tube connected to the aspirator and to said passage for controlling the negative pressure on the suction side of the aspirator, means controlled according to variations in the quantity of water to be treated flowing for producing a negative pressure varying proportionately to the square of variations in the quantity of water flowing, and means for transmitting said varying negative pressure to said water-column tube to control the negative pressure maintained at the suction side of the aspirator.

4. Apparatus for treating flowing water, comprising means providing a flow-controlling orifice, means for supplying a treating gas to said orifice under a constant pressure, a suction device for drawing the gas through the orifice and discharging it into the flowing water to be treated, and means controlled by the flowing water to be treated for varying the pressure on the discharge side of the orifice to maintain for varying rates of flow of the water a fixed ratio between the rate of supply of the treating gas and the rate of flow of the water.

5. Apparatus for treating flowing water, comprising means providing a flow-controlling orifice, means for supplying a treating gas to said orifice under a constant pressure, a suction device for drawing the gas through the orifice and discharging it into the flowing water to be treated, means controlled by the flowing water to be treated for varying the pressure on the discharge side of the orifice to maintain for varying rates of flow of the water a fixed ratio between the rate of supply of the treating gas and the rate of flow of the water, and adjusting means for varying the ratio between the rate of supply of the treating gas and the rate of flow of the water.

6. Apparatus for treating flowing water, comprising means providing a flow-controlling orifice, means for supplying a treating gas to said orifice under a constant pressure, a suction device for drawing the gas through the orifice and discharging it into the flowing water to be treated, and means controlled by a pressure difference developed by the flowing water to be treated for varying the pressure on the discharge side of the orifice to maintain for varying rates of flow of the water a fixed ratio between the rate of supply of the treating gas and the rate of flow of the water.

7. Apparatus for treating flowing water, comprising means for supplying a treating gas under a constant slightly negative pressure, means providing a flow-controlling orifice through which the treating gas passes, a water aspirator for drawing the treating gas through said orifice and mixing it with water and discharging the solution into the water to be treated, and means controlled by a pressure difference developed by the flowing water to be treated for varying the suction head on the discharge side of the orifice to maintain for varying rates of flow of the water a fixed ratio between the rate of supply of the treating gas and the rate of flow of the water.

8. Apparatus for treating flowing water, comprising means providing a flow-controlling orifice, means for supplying a treating gas to said orifice under a constant substantially atmospheric pressure, a suction device connected to draw the gas through said orifice and discharge it into the water to be treated, means whereby a pressure difference is developed by the flowing water to be treated varying with variations in the rate of flow of the water, means for producing a partial vacuum varying with variations in said pressure difference, and means for causing the suction head applied to said measuring orifice to vary with variations in said partial vacuum.

9. Apparatus for treating flowing water, comprising means providing a flow-controlling orifice, means for supplying a treating gas to said orifice under a constant substantially atmospheric pressure, a suction device connected to draw the gas through said orifice and discharge it into the water to be treated, means whereby a pressure difference is developed by the flowing water to be treated varying with variations in the rate of flow of the water, means for producing a partial vacuum varying with variations in said pressure difference, and means for causing the suction head applied to said measuring orifice to vary with variations in said partial vacuum from a pre-determined base corresponding to the constant pressure at which the treating gas is supplied to the orifice.

10. Apparatus for treating flowing water, comprising means providing a flow-controlling orifice, means for supplying a treating gas to said orifice at a constant substantially atmospheric pressure, a suction device connected to draw the gas through the orifice and discharge it into the water to be treated, means whereby a pressure difference is developed by the flowing water to be treated varying with variations in the rate of flow of the water, means for reducing said pressure difference, means controlled by said reduced pressure difference for producing a partial vacuum varying with variations in said pressure difference, and means for controlling the suction head applied to the measuring orifice by said partial vacuum.

11. Apparatus for treating flowing water, comprising means providing a flow-controlling orifice, means for supplying a treating gas to said orifice at a constant substantially atmospheric pressure, a suction device connected to draw the gas through the orifice and discharge it into the water to be treated, means whereby a pressure difference is developed by the flowing water to be treated varying with variations in the rate of flow of the water, means for reducing said pressure difference, means controlled by said reduced pressure difference for producing a partial vacuum varying with variations in said pressure difference, and a vacuum transferring water-seal for causing the suction head applied to said measuring orifice to vary with variations in said partial vacuum.

12. Apparatus for treating flowing water, comprising means providing a flow-controlling orifice, means for supplying a treating gas to the orifice at a constant slightly negative pressure, a suction device for drawing the gas through said orifice and feeding it to the water to be treated, means for producing a partial vacuum varying with variations in the rate of flow of the water to be treated, and means controlled by said partial vacuum for causing the negative pressure on the suction side of the suction device to vary with variations in said partial vacuum and to be at all times equal to said partial vacuum plus the negative pressure under which the treating gas is supplied to said orifice.

13. Apparatus for treating flowing water, comprising means providing a flow-controlling orifice, means for supplying a treating gas to the said orifice at a constant substantially atmospheric pressure, a suction device connected to a passage leading from said orifice, means for determining the negative pressure on the suction side of the suction device by the negative head of a column of liquid raised by the suction device, means for producing a partial vacuum varying with variations in the rate of flow of the water to be treated, and means for controlling said negative head by said partial vacuum.

14. Apparatus for treating flowing water, comprising means providing a flow-controlling orifice, means for supplying a treating gas to said orifice under a constant substantially atmospheric pressure, a water aspirator connected to draw the gas through said orifice and discharge it into the water to be treated, means for producing a partial vacuum varying with variations in the quantity of water to be treated flowing, and means controlled by said partial vacuum for controlling the negative pressure maintained on the suction side of the aspirator, comprising a water-column tube from which a suction passage leads to the aspirator throat, an overflow tube, the bottom of said tubes being connected to form a U tube, means for supplying water to the U tube, and means for applying said varying vacuum to the top of the overflow tube.

15. Apparatus for treating flowing water, comprising means providing a flow-controlling orifice, means for supplying a treating gas to said orifice under a constant substantially atmospheric pressure, a water aspirator connected to draw the gas through said orifice and discharge it into the water to be treated, means for producing a partial vacuum varying with variations in the quantity of water to be treated flowing, and means controlled by said partial vacuum for controlling the negative pressure maintained on the suction side of the aspirator, comprising a water-column tube from which a suction passage leads to the aspirator throat, an overflow tube, the bottom of said tubes being connected to form a U tube, means for supplying water to the U tube, means for controlling the supply of water to the U tube to maintain a constant overflow through the overflow tube under variations in the amount of water drawn by the aspirator from the water-column tube, and means for applying said varying vacuum to the top of the overflow tube.

16. Apparatus for treating flowing water, comprising means providing a flow-controlling orifice, means for supplying a treating gas to said orifice under a constant substantially atmospheric pressure, a water aspirator connected to draw the gas through said orifice and discharge it into the water to be treated, means for producing a partial vacuum varying with variations in the quantity of water to be treated flowing, and means controlled by said partial vacuum for controlling the negative pressure maintained on the suction side of the aspirator, comprising a water-column tube from which a suction passage leads to the aspirator throat, an overflow tube, the bottom of said tubes being connected to form a U tube, means for supplying water to the U tube, a constant level box into which water from the overflow tube falls having a submerged outlet orifice, a valve for controlling the supply of water to the U tube controlled by a float in said constant level box, and means for applying said varying vacuum to the top of the overflow tube.

17. Apparatus for treating flowing water, comprising means providing a flow-controlling orifice, means for supplying a treating gas to said orifice under a constant slightly negative pressure, a water aspirator connected to draw the gas through said orifice and discharge it into the water to be treated, means for producing a partial vacuum varying with variations in the quantity of water to be treated flowing, and means controlled by said partial vacuum for controlling the negative pressure maintained on the suction side of the aspirator, comprising a water-column tube from which a suction passage leads to the aspirator throat, an overflow tube, the bottom of said tubes being connected to form a U tube, means for supplying water to the U tube, and means for applying said varying vacuum to the top of the overflow tube, said suction passage being at an elevation above the top of the overflow tube corresponding to the negative pressure under which the gas is supplied to said orifice.

18. Apparatus for treating flowing water, comprising a gas chamber, means for supplying a treating gas to said chamber, means for controlling the supply of the treating gas to said chamber to maintain a constant slightly negative pressure therein, a gas passage leading from said chamber and having a flow-controlling orifice, a constant level tank having an outlet below the water level for constant outflow of water, a U tube the two branches of which extend upward above the water level of said tank, one of said branches being connected with said gas passage, a suction device, a suction passage leading from said branch of the U tube to said suction device, an inverted tube which extends downward over the other branch of the U tube and has an opening below the water level in said tank, said last mentioned branch of the U tube opening into said inverted tube for the overflow of water from said branch into the tank, means for supplying water to the U tube, a valve for controlling the supply of the water to the U tube controlled by a constant level float in said tank, and means for maintaining in said inverted tube a partial vacuum varying with variations in the rate of flow of the flowing water to be treated.

In testimony whereof I have hereunto set my hand.

CHARLES F. WALLACE.